US 10,997,748 B2

(12) United States Patent
Staudinger et al.

(10) Patent No.: US 10,997,748 B2
(45) Date of Patent: May 4, 2021

(54) MACHINE LEARNING MODEL DEVELOPMENT WITH UNSUPERVISED IMAGE SELECTION (71) Applicant: THE BOEING COMPANY, Chicago, IL (US)

(72) Inventors: Tyler Staudinger, Huntsville, AL (US); Zachary D. Jorgensen, Huntsville, AL (US)

(73) Assignee: The Boeing Company, Chicago, IL (US)

(*) Notice: Subject to any disclaimer, the term of this patent is extended or adjusted under 35 U.S.C. 154(b) by 112 days.

(21) Appl. No.: 16/389,408

(22) Filed: Apr. 19, 2019

(65) Prior Publication Data
US 2020/0334856 A1 Oct. 22, 2020

(51) Int. Cl.
G06T 7/73 (2017.01)
G06K 9/62 (2006.01)
G06N 3/08 (2006.01)

(52) U.S. Cl.
CPC .............. *G06T 7/75* (2017.01); *G06K 9/6218* (2013.01); *G06K 9/6256* (2013.01); *G06N 3/088* (2013.01); *G06T 2207/20081* (2013.01); *G06T 2207/20084* (2013.01)

(58) Field of Classification Search
CPC ............. G06T 7/75; G06T 2207/20081; G06T 2207/20084; G06N 3/088; G06K 9/6218; G06K 9/6256
See application file for complete search history.

(56) References Cited

U.S. PATENT DOCUMENTS

| 10,102,443 | B1* | 10/2018 | Huang | G06K 9/6272 |
|---|---|---|---|---|
| 10,552,471 | B1* | 2/2020 | Dandekar | G06F 16/535 |
| 10,692,002 | B1* | 6/2020 | Kim | G06N 7/00 |
| 2007/0260639 | A1* | 11/2007 | Tobin | G06F 16/5838 |
| 2008/0219529 | A1* | 9/2008 | Alexandrov | G06T 7/0012 |
| | | | | 382/128 |
| 2010/0104191 | A1* | 4/2010 | McGwire | G06T 7/11 |
| | | | | 382/190 |

(Continued)

OTHER PUBLICATIONS

Tian et al., A Face Annotation Framework with Partial Clustering and Interactive Labeling, IEEE (Year: 2007).*

*Primary Examiner* — John B Strege
(74) *Attorney, Agent, or Firm* — Womble Bond Dickinson (US) LLP (57) ABSTRACT A method of machine learning model development includes receiving a plurality of images of a scene, and performing an unsupervised image selection. This includes applying the images to a pre-trained model to extract and embed the images with respective feature vectors, and performing a cluster analysis to group the images in a clusters based on correlations among the respective feature vectors. The unsupervised image selection also includes selecting at least some but not all images in each of the clusters, and any images considered outliers that belong to none of the clusters, for a subset of the images that includes fewer than all of the images. And the method includes receiving user input to label or labeling objects depicted in the subset of the images to produce a training set of images, and building a machine learning model for object detection using the training set of images.

24 Claims, 4 Drawing Sheets (56) References Cited

U.S. PATENT DOCUMENTS

| | | | | |
|---|---|---|---|---|
| 2015/0310309 A1* | 10/2015 | Gopalan | ................. | G06K 9/46 |
| | | | | 382/199 |
| 2019/0034475 A1* | 1/2019 | Parikh | .................... | G06N 20/20 |
| 2020/0073742 A1* | 3/2020 | Arora | ................... | G06K 9/6292 |
| 2020/0167659 A1* | 5/2020 | Moon | .................... | G06N 5/043 |

* cited by examiner

MACHINE LEARNING MODEL DEVELOPMENT WITH UNSUPERVISED IMAGE SELECTION

TECHNOLOGICAL FIELD

The present disclosure relates generally to machine learning and, in particular, to machine learning model development with unsupervised image selection.

BACKGROUND

Machine learning is a process to analyze data in which the dataset is used to determine a machine learning model (also called a rule or a function) that maps input data (also called explanatory variables or predictors) to output data (also called dependent variables or response variables) according to a machine learning algorithm. A broad array of machine learning algorithms are available, with new algorithms the subject of active research. One type of machine learning is supervised learning in which a model is trained with a dataset including known output data for a sufficient number of input data. Once a model is trained, it may be deployed, i.e., applied to new input data to predict the expected output.

Machine learning may be applied to a number of different types of problems, such as classification problems in which the output data includes labels, classes, categories and the like. In some particular examples, machine learning may be applied in object detection problems to detect and classify (e.g., label) instances of objects depicted in digital images (including videos). Many successful uses of supervised learning rely on vast quantities of labeled data to perform well. But the generation of labels is a very labor intensive and cost intensive activity.

Therefore it would be desirable to have a system and method that takes into account at least some of the issues discussed above, as well as other possible issues.

BRIEF SUMMARY

Example implementations of the present disclosure are directed to machine learning model development and/or deployment. Example implementations use an unsupervised image selection to select the most informative images to label for object detection. Similarly, example implementations may cull images with redundant content to leave those images with content that is not well correlated. Example implementations may also provide a machine-in-the-loop active learning strategy to enable the creation of high performance models with significantly reduced labeling cost.

The present disclosure thus includes, without limitation, the following example implementations.

Some example implementations provide a method of machine learning model development, the method comprising: receiving a plurality of images of a scene; performing an unsupervised image selection from images of the plurality of images, including: applying the images to a pre-trained model to extract and embed the images with respective feature vectors that represent objects depicted therein; performing a cluster analysis of the images with respective feature vectors to group the images in a plurality of clusters based on correlations among the respective feature vectors; and selecting at least some but not all images in each of the plurality of clusters, and any images considered outliers that belong to none of the plurality of clusters, for a subset of the images that includes fewer than all of the images; receiving user input to label or labeling objects depicted in the subset of the images to produce a training set of images; and building a machine learning model for object detection using the training set of images.

In some example implementations of the method of any preceding example implementation, or any combination of any preceding example implementations, the plurality of images are a sequence of images captured with a given sampling frequency, and the method further comprises: down-sampling the sequence of images to reduce the plurality of images in number to the images from which the unsupervised image selection is performed.

In some example implementations of the method of any preceding example implementation, or any combination of any preceding example implementations, performing the unsupervised image selection further includes: determining respective levels of entropy in the images that correspond to levels of disorganization in the respective feature vectors; and from the respective levels of entropy, discarding from the images any image having a level of entropy less than a threshold, before the cluster analysis is performed.

In some example implementations of the method of any preceding example implementation, or any combination of any preceding example implementations, performing the unsupervised image selection further includes: performing a principal component analysis of the images to reduce the respective feature vectors in number of features therein, and thereby compress the respective feature vectors, before the cluster analysis is performed.

In some example implementations of the method of any preceding example implementation, or any combination of any preceding example implementations, the method further comprises deploying the machine learning model, including: receiving a plurality of new images of the scene; and applying new images of the plurality of new images to the machine learning model to detect and label objects depicted in the new images.

In some example implementations of the method of any preceding example implementation, or any combination of any preceding example implementations, the plurality of new images are a sequence of new images captured with a given sampling frequency, and the method further comprises: down-sampling the sequence of new images to reduce the plurality of new images in number before the new images are applied to the machine learning model.

In some example implementations of the method of any preceding example implementation, or any combination of any preceding example implementations, the method further comprises: performing the unsupervised image selection from the plurality of new images reduced in number to select the new images applied to the machine learning model.

In some example implementations of the method of any preceding example implementation, or any combination of any preceding example implementations, the method further comprises: adding the new images with the objects detected and labeled to the training set of images from which the machine learning model is built.

Some example implementations provide an apparatus for machine learning model development, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for machine learning model development, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to machine learning and, in particular, to machine learning model development with unsupervised image selection. Example implementations use an unsupervised image selection to select the most informative images to label for object detection, culling images with redundant content to leave images with content that is not well correlated. Example implementations may also provide a machine-in-the-loop active learning strategy to enable the creation of high performance models with significantly reduced labeling cost.

Figure 1:
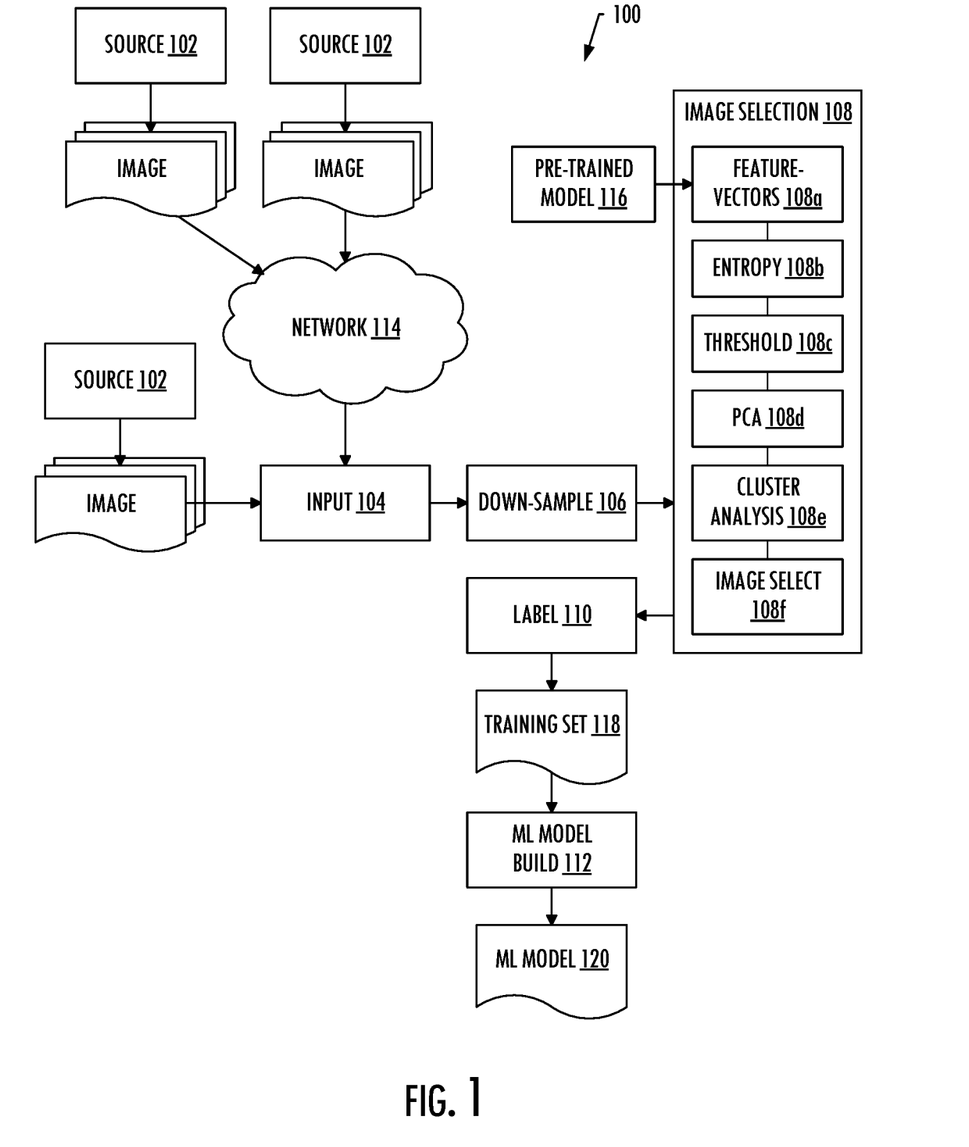
FIG. 1 illustrates a system for machine learning model development, according to example implementations of the present disclosure.

FIG. 1 illustrates a system 100 for machine learning model development, according to example implementations of the present disclosure. The system may include any of a number of different subsystems (each an individual system) for performing one or more functions or operations. As shown, in some examples, the system includes at least one source 102 of images, an input 104, down-sample module 106, image-selection engine 108, label module 110, and/or machine learning (ML) model build module 112.

The subsystems including the source(s) 102, input 104, down-sample module 106, image-selection engine 108, label module 110, and/or ML model build module 112 may be co-located or directly coupled to one another, or in some examples, various ones of the subsystems may communicate with one another across one or more computer networks 114. Further, although shown as part of the system 100, it should be understood that any one or more of the above may function or operate as a separate system without regard to any of the other subsystems. It should also be understood that the system may include one or more additional or alternative subsystems than those shown in FIG. 1.

As described herein, a source 102 is a source of one or more images. In some examples, the source includes a memory that may be located at a single source or distributed across multiple sources. The image(s) may be stored in a number of different manners, such as in a database or flat files of any of a number of different types or formats.

The input 104 is configured to receive a plurality of images of a scene from one or more sources 102, and the image selection engine 108 is configured to perform an unsupervised image selection from images of the plurality of images. In some examples, the plurality of images are a sequence of images captured with a given sampling frequency. In some of these examples, the system 100 further includes the down-sample module 106 to at least down-sample the sequence of images to reduce the plurality of images in number to the images from which the unsupervised image selection is performed. In a particular example in which the sampling frequency is 30 Hertz, the sequence of images may be down-sampled to 1 Hertz.

In some examples, the image selection engine 108 is a subsystem that itself includes any of a number of different modules for performing one or more functions or operations. As shown, in some examples, the image selection engine includes a feature-vector module 108a, entropy module 108b, threshold module 108c, principal component analysis (PCA) module 108d, cluster-analysis module 108e and/or image select module 108f. These modules may be co-located or directly coupled to one another, or in some examples, various ones of the subsystems may communicate with one another across one or more computer networks 114. Further, although shown as part of the image selection engine, it should be understood that any one or more of the above modules may function or operate as a separate subsystem or system without regard to any of the other modules. It should also be understood that the image selection engine may include one or more additional or alternative modules than those shown in FIG. 1.

The feature-vector module 108a of the image selection engine 108 is configured to apply the images to a pre-trained model 116 to extract and embed the images with respective feature vectors that represent objects depicted therein. One example of a suitable pre-trained model is the ImageNet image database organized according to the WordNet hierarchy, and designed for use in object recognition. The cluster-analysis module 108e is configured to perform a cluster analysis of the images with respective feature vectors to group the images in a plurality of clusters based on correlations among the respective feature vectors. One example of a suitable cluster analysis is performed according to the Hierarchical Density-Based Spatial Clustering of Applications with Noise (HDBSCAN) algorithm. The image select module 108f is configured to select at least some but not all images in each of the plurality of clusters, and any images considered outliers that belong to none of the plurality of clusters, for a subset of the images that includes fewer than all of the images.

In examples including the entropy module 108b and threshold module 108c, the entropy module of the image selection engine 108 is configured to determine respective levels of entropy in the images that correspond to levels of disorganization in the respective feature vectors. And from the respective levels of entropy, the threshold module is configured to discard from the images any image having a level of entropy less than a threshold, before the cluster analysis is performed. The threshold may be set in any of a number of different manners, such as based on a distribution of levels of entropy across the images. Further, in examples including the PCA module 108d, the PCA module is configured to perform a principal component analysis of the images to reduce the respective feature vectors in number of features therein, and thereby compress the respective feature vectors, before the cluster analysis is performed.

Again, the image select module 108f is configured to select images for a subset of the images that includes fewer than all of the images. The label module 110, then, is configured to receive user input to label or itself label objects depicted in the subset of the images to produce a training set of images 118. In some examples, the label module may receive user input to label objects according to a crowd-sourcing sourcing model in which a large number of individuals may provide input, such as over computer network(s) 114.

The ML model build module 112 is configured to build a machine learning model 120 for object detection using the training set of images 118 (the model at times referred to as an object detector). In some examples, the model builder may build more than one machine learning model using the training set. These different models may be built using different parameters, machine learning algorithms or the like.

Figure 2:
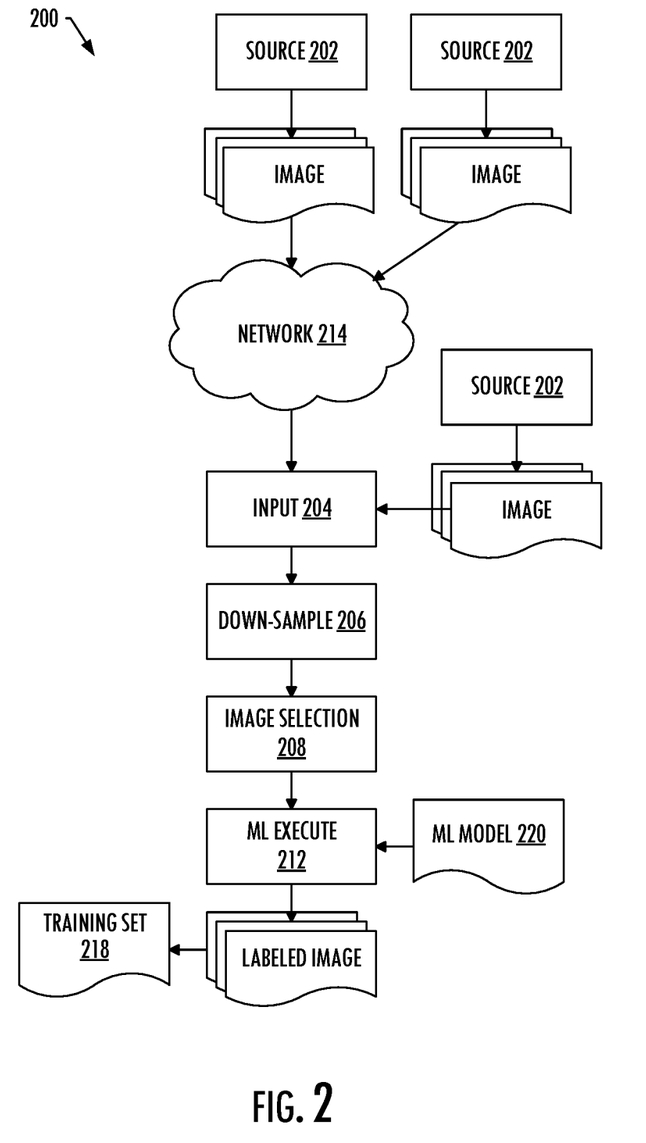
FIG. 2 illustrates a system for machine learning model deployment, according to example implementations.

FIG. 2 illustrates a system 200 for machine learning model deployment, according to example implementations of the present disclosure. In some examples, the system 200 is integrated with the system 100 for machine learning model development shown and described above with respect to FIG. 1. In these examples, the system 100 may further include the system 200 (the system here a subsystem of system 100) configured to deploy the machine learning model. In other examples, the system 200 in FIG. 2 is separate and distinct from the system 100 in FIG. 1.

Similar to the system 100 in FIG. 1, the system 200 in FIG. 2 may include any of a number of different subsystems (each an individual system) for performing one or more functions or operations. As shown, in some examples, the system includes at least one source 202 of images, an input 204, down-sample module 206, image-selection engine 208, and/or ML execute module 212. In some examples in which the systems 100, 200 are integrated, the source(s) 202, input 204, down-sample module 206 and/or image-selection engine 208 may correspond to respective ones of the source(s) 102, input 104, down-sample module 106, image-selection engine 108.

The subsystems including the source(s) 202, input 204, down-sample module 206, image-selection engine 208, and/or ML execute module 212 may be co-located or directly coupled to one another, or in some examples, various ones of the subsystems may communicate with one another across one or more computer networks 214, which in some examples may correspond to computer network(s) 114. Further, although shown as part of the system 200, it should be understood that any one or more of the above may function or operate as a separate system without regard to any of the other subsystems. It should also be understood that the system may include one or more additional or alternative subsystems than those shown in FIG. 2.

Similar to source 102, a source 202 is a source of one or more images. In some examples, the source includes a memory that may be located at a single source or distributed across multiple sources. The image(s) may be stored in a number of different manners, such as in a database or flat files of any of a number of different types or formats.

The input 204 is configured to receive a plurality of images of a scene from one or more sources 202, and the ML execute module 212 is configured to apply new images of the plurality of images to a machine learning model 220 to detect and label objects depicted in the images. In some examples, the plurality of images are new images of the scene relative to the images described above with respect to FIG. 1. Similarly, in some examples, the machine learning model 220 corresponds to the machine learning model 120 in FIG. 1. These examples are primarily described below, although it should be understood that in other examples, the plurality of new images and/or machine learning model may be unrelated to those shown and described above with respect to FIG. 1. It should also be understood that in some examples, the ML execute module may apply the new images to more than one machine learning model that may differ by parameters, machine learning algorithms or the like.

In some examples, the plurality of new images are a sequence of new images captured with a given sampling frequency. In these examples, the system 200 further includes down-sample module 206 configured to at least down-sample the sequence of new images (e.g., 30 Hertz to 1 Hertz) to reduce the plurality of new images in number before the new images are applied to the machine learning model 220.

In some examples, the system 200 further includes the image-selection engine 208 configured to at least perform an unsupervised image selection from the plurality of new images reduced in number to select the new images applied to the machine learning model 220. In these examples, the image-selection engine 208 may operate similar to the image-selection engine 108 shown in FIG. 1.

Although not separately shown in FIG. 2, similar to the image selection engine 108, in some examples, the image selection engine 208 is a subsystem that itself includes any of a number of different modules for performing one or more functions or operations. The image selection engine 208 may include a feature-vector module, entropy module, threshold module, PCA module, cluster-analysis module and/or image select module that correspond to respective ones of the feature-vector module 108a, entropy module 108b, threshold module 108c, principal component analysis (PCA) module 108d, cluster-analysis module 108e and/or image select module 108f. These modules of the image selection engine 208 may be co-located or directly coupled to one another, or in some examples, various ones of the subsystems may communicate with one another across one or more computer networks 214.

The feature-vector module of the image selection engine 208 is configured to apply the new images to a pre-trained model (e.g., ImageNet) (the same or different than the pre-trained model 116) to extract and embed the new images with respective feature vectors that represent objects depicted therein. The cluster-analysis module is configured to perform a cluster analysis of the new images with respective feature vectors to group the new images in a plurality of clusters based on correlations among the respective feature vectors. And the image select module is configured to select at least some but not all new images in each of the plurality of clusters, and any new images considered outliers that belong to none of the plurality of clusters, for a subset of the new images that includes fewer than all of the new images.

In examples including the entropy module and threshold module, the entropy module of the image selection engine 208 is configured to determine respective levels of entropy in the new images that correspond to levels of disorganization in the respective feature vectors. And from the respective levels of entropy, the threshold module is configured to discard from the new images any new image having a level of entropy less than a threshold, before the cluster analysis is performed. The threshold may be set in any of a number of different manners, such as based on a distribution of levels of entropy across the new images. Further, in examples including the PCA module, the PCA module is configured to perform a principal component analysis of the new images to reduce the respective feature vectors in number of features therein, and thereby compress the respective feature vectors, before the cluster analysis is performed.

Again, the ML execute module 212 is configured to apply new images of the plurality of images to a machine learning model 220 to detect and label objects depicted in the images. In some examples, the ML execute module or another module of the system 200 is configured to at least add the new images with the objects detected and labeled to a training set of images 218 from which the machine learning model 220 is built. In some examples in which the machine learning model 220 corresponds to machine learning model 120, the training set of images 218 corresponds to the training set of images 118.

Figure 3:
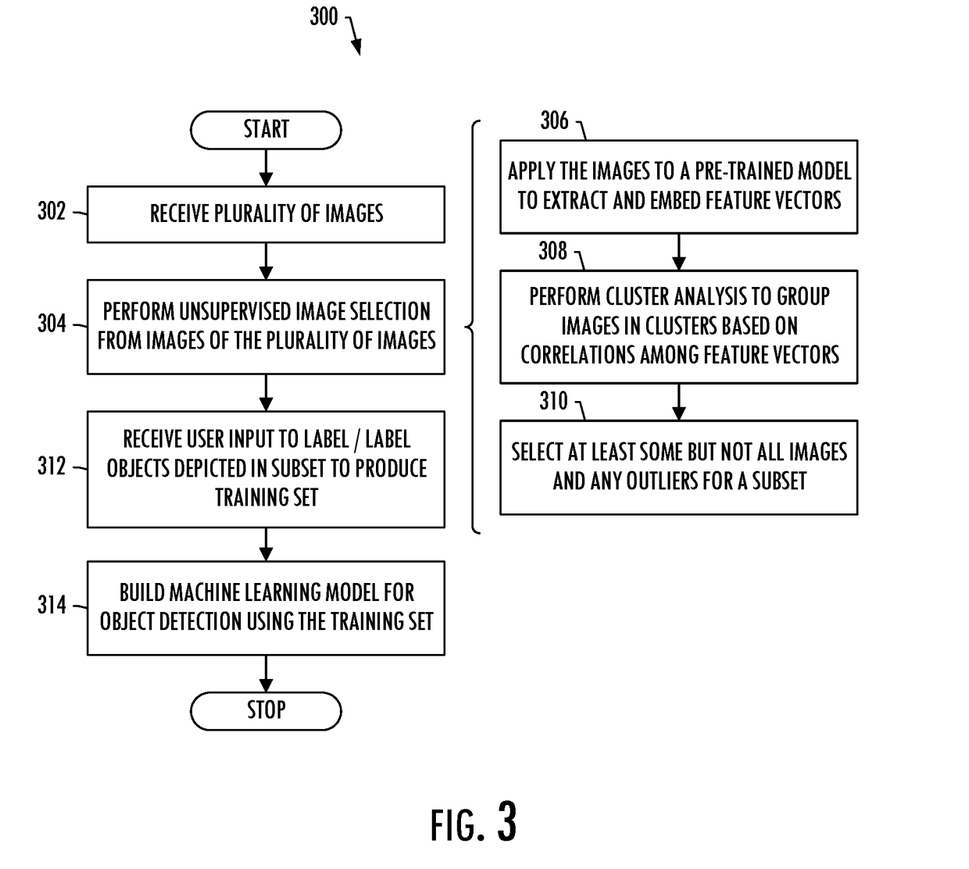
FIG. 3 is a flowchart illustrating various steps in a method of machine learning model development, according to example implementations.

FIG. 3 is a flowchart illustrating various steps in a method 300 of machine learning model development, according to example implementations of the present disclosure. As shown at blocks 302, 304, the method includes receiving a plurality of images of a scene, and performing an unsupervised image selection from images of the plurality of images. In this regard, the unsupervised image selection includes applying the images to a pre-trained model to extract and embed the images with respective feature vectors that represent objects depicted therein, as shown at block 306. The unsupervised image selection includes performing a cluster analysis of the images with respective feature vectors to group the images in a plurality of clusters based on correlations among the respective feature vectors, as shown at block 308. The unsupervised image selection also includes selecting at least some but not all images in each of the plurality of clusters, and any images considered outliers that belong to none of the plurality of clusters, for a subset of the images that includes fewer than all of the images, as shown at block 310. And the method includes receiving user input to label or labeling objects depicted in the subset of the images to produce a training set of images, and building a machine learning model for object detection using the training set of images, as shown at blocks 312, 314.

According to example implementations of the present disclosure, the systems 100, 200 and their subsystems including the source 102, input 104, down-sample module 106, image-selection engine 108, label module 110, ML model build module 112, source 202, input 204, down-sample module 206, image-selection engine 208, and/or ML execute module 212 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
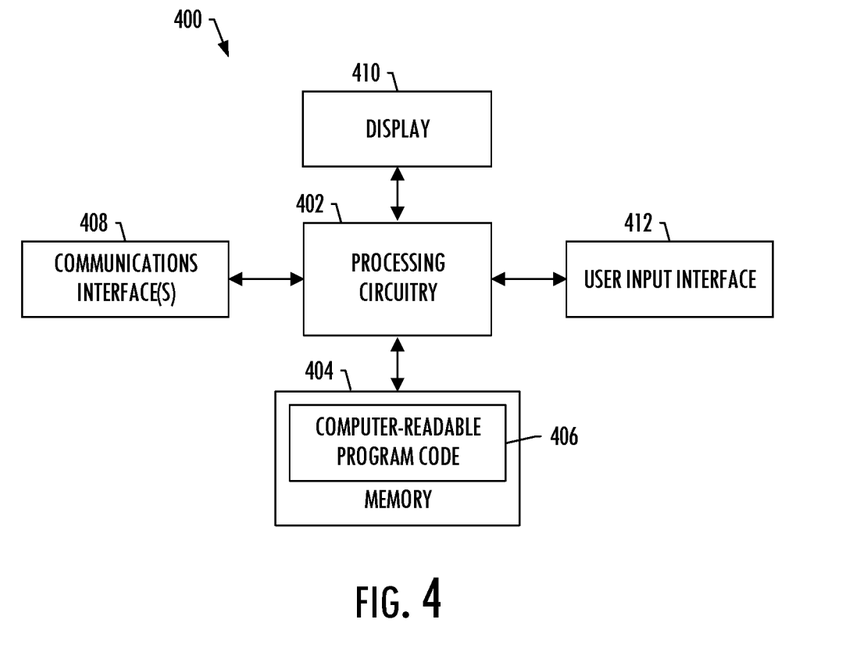
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for machine learning model development, the apparatus comprising:
   a memory configured to store computer-readable program code; and
   processing circuitry configured to access the memory, and execute the computer-readable program code to cause the apparatus to at least:
   receive a plurality of images of a scene;
   perform an unsupervised image selection from images of the plurality of images, including the apparatus being caused to:
      apply the images to a pre-trained model to extract and embed the images with respective feature vectors that represent objects depicted therein;
      perform a cluster analysis of the images with respective feature vectors to group the images in a plurality of clusters based on correlations among the respective feature vectors; and
      select at least some but not all images in each of the plurality of clusters, and any images considered outliers that belong to none of the plurality of clusters, for a subset of the images that includes fewer than all of the images;
   receive user input to label or labeling objects depicted in the subset of the images to produce a training set of images; and
   build a machine learning model for object detection using the training set of images.

2. The apparatus of claim 1, wherein the plurality of images are a sequence of images captured with a given sampling frequency, and the processing circuitry is configured to execute the computer-readable program code to cause the apparatus to further at least:
   down-sample the sequence of images to reduce the plurality of images in number to the images from which the unsupervised image selection is performed.

3. The apparatus of claim 1, wherein the apparatus being caused to perform the unsupervised image selection includes being caused to further at least:
   determine respective levels of entropy in the images that correspond to levels of disorganization in the respective feature vectors; and from the respective levels of entropy,
   discard from the images any image having a level of entropy less than a threshold, before the cluster analysis is performed.

4. The apparatus of claim 1, wherein the apparatus being caused to perform the unsupervised image selection includes being caused to further at least:
   perform a principal component analysis of the images to reduce the respective feature vectors in number of features therein, and thereby compress the respective feature vectors, before the cluster analysis is performed.

5. The apparatus of claim 1, wherein the processing circuitry is configured to execute the computer-readable program code to cause the apparatus to further deploy the machine learning model, including the apparatus being caused to at least:
   receive a plurality of new images of the scene; and
   apply new images of the plurality of new images to the machine learning model to detect and label objects depicted in the new images.

6. The apparatus of claim 5, wherein the plurality of new images are a sequence of new images captured with a given sampling frequency, and processing circuitry is configured to execute the computer-readable program code to cause the apparatus to further at least:
   down-sample the sequence of new images to reduce the plurality of new images in number before the new images are applied to the machine learning model.

7. The apparatus of claim 6, wherein the processing circuitry is configured to execute the computer-readable program code to cause the apparatus to further at least:
   perform the unsupervised image selection from the plurality of new images reduced in number to select the new images applied to the machine learning model.

8. The apparatus of claim 5, wherein the processing circuitry is configured to execute the computer-readable program code to cause the apparatus to further at least:
   add the new images with the objects detected and labeled to the training set of images from which the machine learning model is built.

9. A method of machine learning model development, the method comprising:
   receiving a plurality of images of a scene;
   performing an unsupervised image selection from images of the plurality of images, including:
      applying the images to a pre-trained model to extract and embed the images with respective feature vectors that represent objects depicted therein;
      performing a cluster analysis of the images with respective feature vectors to group the images in a plurality of clusters based on correlations among the respective feature vectors; and
      selecting at least some but not all images in each of the plurality of clusters, and any images considered outliers that belong to none of the plurality of clusters, for a subset of the images that includes fewer than all of the images;
   receiving user input to label or labeling objects depicted in the subset of the images to produce a training set of images; and
   building a machine learning model for object detection using the training set of images.

10. The method of claim 9, wherein the plurality of images are a sequence of images captured with a given sampling frequency, and the method further comprises:
    down-sampling the sequence of images to reduce the plurality of images in number to the images from which the unsupervised image selection is performed.

11. The method of claim 9, wherein performing the unsupervised image selection further includes:
    determining respective levels of entropy in the images that correspond to levels of disorganization in the respective feature vectors; and from the respective levels of entropy,
    discarding from the images any image having a level of entropy less than a threshold, before the cluster analysis is performed.

12. The method of claim 9, wherein performing the unsupervised image selection further includes:
    performing a principal component analysis of the images to reduce the respective feature vectors in number of features therein, and thereby compress the respective feature vectors, before the cluster analysis is performed.

13. The method of claim 9 further comprising deploying the machine learning model, including:
    receiving a plurality of new images of the scene; and applying new images of the plurality of new images to the machine learning model to detect and label objects depicted in the new images.

14. The method of claim 13, wherein the plurality of new images are a sequence of new images captured with a given sampling frequency, and the method further comprises:
down-sampling the sequence of new images to reduce the plurality of new images in number before the new images are applied to the machine learning model.

15. The method of claim 14 further comprising:
performing the unsupervised image selection from the plurality of new images reduced in number to select the new images applied to the machine learning model.

16. The method of claim 13 further comprising:
adding the new images with the objects detected and labeled to the training set of images from which the machine learning model is built.

17. A computer-readable storage medium for machine learning model development, the computer-readable storage medium being non-transitory and having computer-readable program code stored therein that, in response to execution by processing circuitry, causes an apparatus to at least:
receive a plurality of images of a scene;
perform an unsupervised image selection from images of the plurality of images, including the apparatus being caused to:
apply the images to a pre-trained model to extract and embed the images with respective feature vectors that represent objects depicted therein;
perform a cluster analysis of the images with respective feature vectors to group the images in a plurality of clusters based on correlations among the respective feature vectors; and
select at least some but not all images in each of the plurality of clusters, and any images considered outliers that belong to none of the plurality of clusters, for a subset of the images that includes fewer than all of the images;
receive user input to label or labeling objects depicted in the subset of the images to produce a training set of images; and
build a machine learning model for object detection using the training set of images.

18. The computer-readable storage medium of claim 17, wherein the plurality of images are a sequence of images captured with a given sampling frequency, and the computer-readable storage medium has further computer-readable program code stored therein that, in response to execution by the processing circuitry, causes the apparatus to further at least:
down-sample the sequence of images to reduce the plurality of images in number to the images from which the unsupervised image selection is performed.

19. The computer-readable storage medium of claim 17, wherein the apparatus being caused to perform the unsupervised image selection includes being caused to further at least:
determine respective levels of entropy in the images that correspond to levels of disorganization in the respective feature vectors; and from the respective levels of entropy,
discard from the images any image having a level of entropy less than a threshold, before the cluster analysis is performed.

20. The computer-readable storage medium of claim 17, wherein the apparatus being caused to perform the unsupervised image selection includes being caused to further at least:
perform a principal component analysis of the images to reduce the respective feature vectors in number of features therein, and thereby compress the respective feature vectors, before the cluster analysis is performed.

21. The computer-readable storage medium of claim 17, having further computer-readable program code stored therein that, in response to execution by the processing circuitry, causes the apparatus to further deploy the machine learning model, including the apparatus being caused to at least:
receive a plurality of new images of the scene; and
apply new images of the plurality of new images to the machine learning model to detect and label objects depicted in the new images.

22. The computer-readable storage medium of claim 21, wherein the plurality of new images are a sequence of new images captured with a given sampling frequency, and the computer-readable storage medium has further computer-readable program code stored therein that, in response to execution by the processing circuitry, causes the apparatus to further at least:
down-sample the sequence of new images to reduce the plurality of new images in number before the new images are applied to the machine learning model.

23. The computer-readable storage medium of claim 22, having further computer-readable program code stored therein that, in response to execution by the processing circuitry, causes the apparatus to further at least:
perform the unsupervised image selection from the plurality of new images reduced in number to select the new images applied to the machine learning model.

24. The computer-readable storage medium of claim 21, having further computer-readable program code stored therein that, in response to execution by the processing circuitry, causes the apparatus to further at least:
add the new images with the objects detected and labeled to the training set of images from which the machine learning model is built.

* * * * *